United States Patent
Kondo et al.

(10) Patent No.: US 10,527,006 B2
(45) Date of Patent: Jan. 7, 2020

(54) MOUNTING STRUCTURE OF WATER INJECTION DEVICE OF INTERNAL COMBUSTION ENGINE

(71) Applicant: Honda Motor Co., Ltd., Tokyo (JP)

(72) Inventors: Takashi Kondo, Saitama (JP); Yutaka Kohda, Saitama (JP); Shiro Takakura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/152,429

(22) Filed: Oct. 5, 2018

(65) Prior Publication Data

US 2019/0128217 A1 May 2, 2019

(30) Foreign Application Priority Data

Oct. 27, 2017 (JP) .................. 2017-207778

(51) Int. Cl.
*F02M 25/025* (2006.01)
*F02M 35/10* (2006.01)

(52) U.S. Cl.
CPC .... *F02M 25/025* (2013.01); *F02M 35/10262* (2013.01)

(58) Field of Classification Search
CPC ............... F02M 35/104; F02M 25/025; F02M 21/0278; F02M 25/022; F02M 35/10262; F02M 69/046
See application file for complete search history.

(56) References Cited

U.S. PATENT DOCUMENTS

| | | | | |
|---|---|---|---|---|
| 5,018,362 A | * | 5/1991 | Nagase | B60H 1/322 62/133 |
| 5,832,880 A | * | 11/1998 | Dickey | F02B 1/12 123/25 C |
| 2005/0205067 A1 | * | 9/2005 | Koide | F02M 35/10039 123/470 |
| 2007/0095305 A1 | * | 5/2007 | Matsuda | F01P 3/16 123/41.31 |
| 2011/0088657 A1 | * | 4/2011 | Tanno | F02D 35/028 123/305 |

FOREIGN PATENT DOCUMENTS

JP 2016118109 6/2016

* cited by examiner

*Primary Examiner* — Long T Tran
(74) *Attorney, Agent, or Firm* — JCIPRNET

(57) ABSTRACT

Provided is a mounting structure of a water injection device of an internal combustion engine. The mounting structure is for a water injector (11) of the internal combustion engine. The water injector (11) is mounted to the intake port (6) of the internal combustion engine (1) installed in a vehicle and injects water into the intake port (6) during operation of the internal combustion engine (1). The water injector (11) has a body part (12) mounted to the intake port (6) and an injection port (13a) disposed at the front end of the body part (12) in a state of facing the interior of the intake port (6) and injecting water (W). The intake port (6) has an inclined wall (21) for preventing water from flowing to the downstream side of the intake port (6) when water leaks from the injection port (13a).

4 Claims, 2 Drawing Sheets

MOUNTING STRUCTURE OF WATER INJECTION DEVICE OF INTERNAL COMBUSTION ENGINE

CROSS REFERENCE TO RELATED APPLICATION

The disclosure claims priority under 35 U.S.C. § 119 to Japanese Application No. 2017-207778 filed Oct. 27, 2017, the entire content of which is incorporated herein by reference.

BACKGROUND

Technical Field

The disclosure relates to a mounting structure of a water injection device which is mounted to an intake port of an internal combustion engine installed in a vehicle and injects water into the intake port during operation of the internal combustion engine.

Description of Related Art

An internal combustion engine which is equipped with a water injection device mounted to an intake port of the internal combustion engine and injecting water during operation of the internal combustion engine is conventionally known, as described in Patent Document 1 (Japanese Laid-Open No. 2016-118109), for example. In this internal combustion engine, a first water injector is mounted to a combustion chamber of each of multiple cylinders or an intake port that communicates with the combustion chamber, and a second water injector is mounted to the most downstream position of an intake passage connected to multiple intake ports via an intake manifold. In addition, in the above internal combustion engine, whether or not backfire occurs within an intake route (the combustion chamber and the intake port) of each of the cylinders is judged based on the pressure and temperature in the intake manifold, the in-cylinder pressure of each of the cylinders, etc.

When it is judged that backfire occurs during operation of the internal combustion engine, a predetermined amount of water is injected from the first water injector to the combustion chamber side, thereby putting out the backfire and lowering the temperature at the intake route to reduce occurrence of backfire. In addition, as the temperature at the intake manifold rises with the occurrence of backfire, a certain amount of water is also injected into the intake manifold from the second water injector, thereby putting out the backfire reaching the intake manifold or lowering the temperature of the intake manifold. As described above, in the above internal combustion engine, the occurrence of backfire is suppressed by injecting water from the first and second water injectors, and excessive temperature rise at the intake route of each of the cylinders and the intake manifold is suppressed.

In the above internal combustion engine, the first water injector (hereinafter simply referred to as "water injector" in this column) is mounted to the combustion chamber of each of the cylinders or the intake port that is very close to the combustion chamber. Therefore, for example, when the internal combustion engine stops operating, if water leaks from the water injector due to malfunctioning of the water injector, the water may enter the combustion chamber directly or through the intake port. As a result, the water accumulates in the combustion chamber, and if the internal combustion engine is started in such a state, the so-called water hammer may occur, which may cause problems in the internal combustion engine.

In view of the above, the disclosure provides a mounting structure for a water injection device of an internal combustion engine. The mounting structure is capable of preventing water which leaks due to malfunctioning of the water injection device, etc. from entering the combustion chamber while ensuring that water is injected to the intake port by the water injection device.

SUMMARY

An embodiment of the disclosure provides a mounting structure of a water injection device (the water injector 11 in the embodiment, the same applies hereinafter in this section). The water injection device is mounted to an intake port 6 of the internal combustion engine 1 installed in a vehicle and injects water W into the intake port during operation of the internal combustion engine. The water injection device has a body part 12 mounted to the intake port and an injection port 13a disposed at a front end of the body part in a state of facing the interior of the intake port and injecting water. The intake port has a leaked water blocking part (the inclined wall 21) for preventing water from flowing to a downstream side of the intake port when water leaks from the injection port.

DESCRIPTION OF THE EMBODIMENTS

Figure 1A:
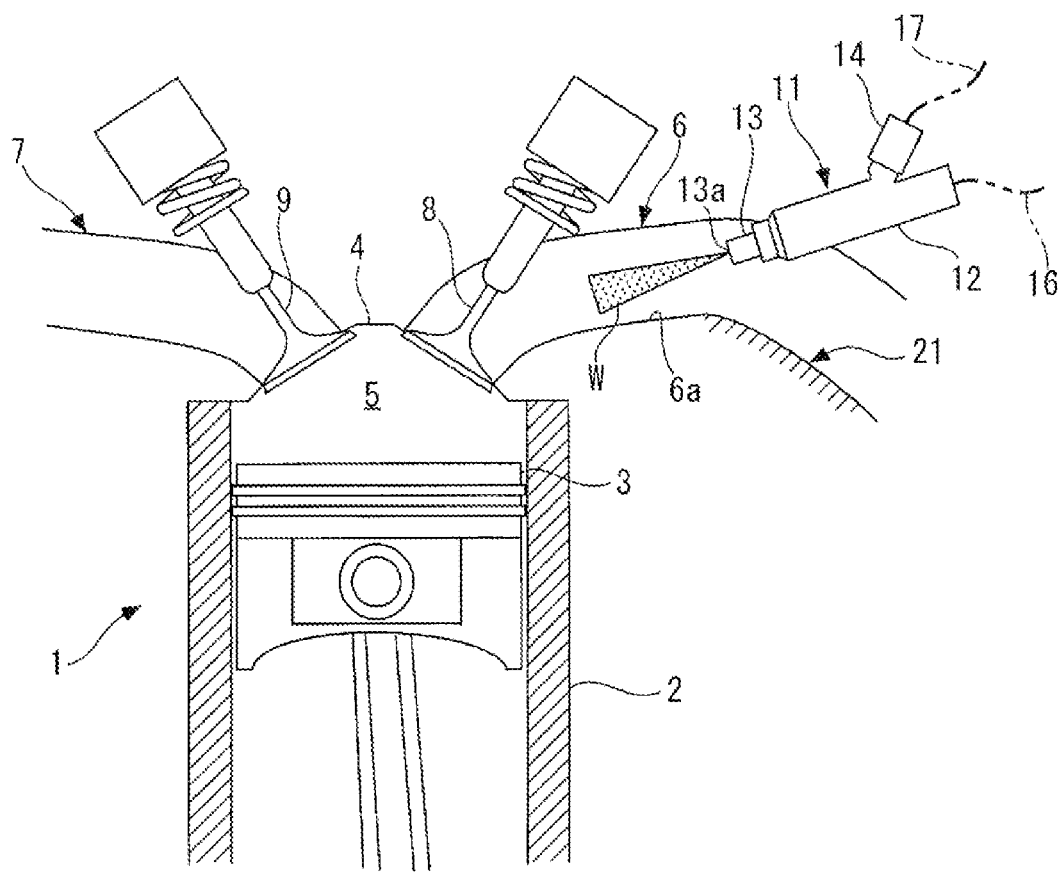
FIG. 1(a) is a view partially showing an internal combustion engine to which a mounting structure of a water injection device according to an embodiment of the disclosure is applied.

Embodiments of the disclosure are described in detail below with reference to the drawings. FIG. 1(a) partially shows an internal combustion engine to which a mounting structure of a water injection device according to an embodiment of the disclosure is applied. As shown in the figure, the internal combustion engine (hereinafter referred to as "engine") 1 is, for example, a gasoline engine, and has a plurality of cylinders 2 and pistons 3 (only one cylinder 2 and one piston 3 are shown in the figure). A combustion chamber 5 is defined between a cylinder head 4 and the piston 3 above each of the cylinders 2. On the cylinder head 4, an intake port 6 and an exhaust port 7 communicating with each combustion chamber 5 are disposed, and an intake valve 8 and an exhaust valve 9 for opening/closing the intake port 6 and the exhaust port 7 respectively are disposed.

Although not shown in the figure, a fuel injector for injecting fuel is mounted to the cylinder head 4 or the intake port 6, and a spark plug for igniting an air-fuel mixture of fuel and intake air in the combustion chamber 5 is mounted to the cylinder head 4.

A water injector 11 (a water injection device) for injecting water into the intake port 6 during operation of the engine 1 is mounted to the upper part of the intake port 6. The water injector 11 has a substantially cylindrical outer shape and includes a body part 12 mounted in a state of being fixed to the intake port 6, a nozzle part 13 disposed to be protrusive from the front end part of the body part 12, etc.

A water supply hose 16 for supplying water from a water tank (not shown) to the water injector 11 is connected to the rear end part of the body part 12. A connector part 14 connected with an electrical wire 17 for transmitting a control signal from an electronic control unit (ECU, not shown) is disposed at the rear part of the body part 12.

In addition, the nozzle part 13 has an injection port 13a at the front end. The injection port 13a is opened toward the downstream side (the side of the combustion chamber 5) of the intake port 6. The injection port 13a includes a single opening or a plurality of openings, and the water injected from the injection port 13a is sprayed so as to spread in the injection direction in a mist state.

In the water injector 11 configured as described above, an injection mechanism (not shown) disposed in the body part 12 is driven by a control signal from the ECU, and water is injected into the intake port 6 via the injection port 13a. More specifically, during the operation of the engine 1, a predetermined amount of water is injected toward the downstream of the intake port 6 at a predetermined timing. The timing at which and the amount of which the water injector 11 injects water are determined as appropriate according to a plurality of parameters, such as the operating state and the temperature of the engine 1.

An inner wall 6a of the intake port 6 has an inclined wall 21 (a leaked water blocking part, shown as a hatched portion) that is below the injection port 13a of the water injector 11. The inclined wall 21 is inclined forwardly downward toward the upstream side (lower right side in FIG. 1(a) and FIG. 1(b)) of the intake port 6. When water leaks out from the injection port 13a due to malfunctioning of the water injector 11, etc., this inclined wall 21 serves to prevent the water from flowing to the downstream side of the intake port 6.

Figure 1B:
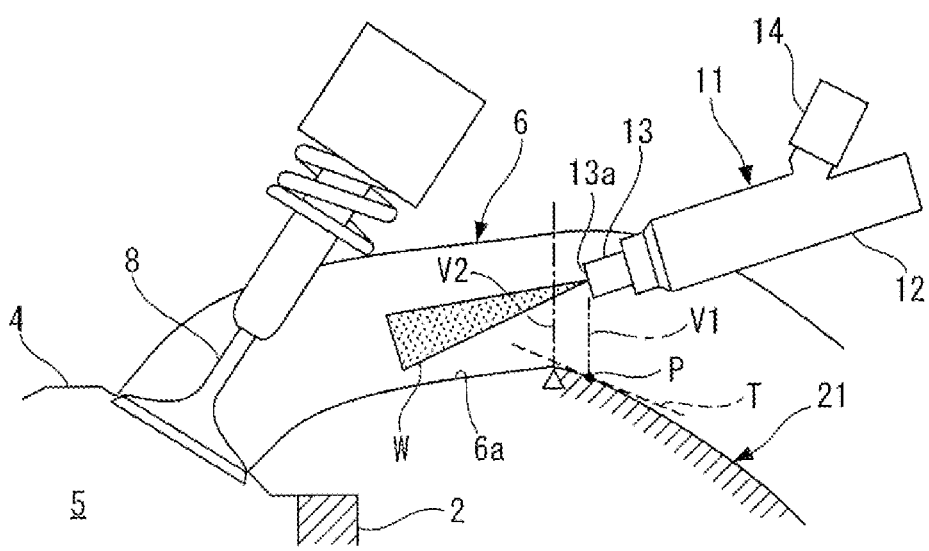
FIG. 1(b) is an enlarged view showing a water injector and an intake port in the internal combustion engine of FIG. 1(a).

FIG. 1(b) is an enlarged view showing the water injector 11 and the intake port 6 in the engine 1 of FIG. 1(a). In FIG. 1(b), Δ is used to indicate the vertex of the lower surface of the inner wall 6a of the intake port 6 as well as the uppermost position of the inclined wall 21.

Furthermore, the water injector 11 is mounted to the upper part of the intake port 6 so that the injection port 13a of the water injector 11 and the inclined wall 21 of the intake port 6 have a positional relationship as described below. That is, an intersection point (hereinafter referred to as "position P" as appropriate) between the inner wall 6a of the intake port 6 and a vertical line V1 passing through the injection port 13a is positioned on the inclined wall 21. More specifically, the position P is closer to the upstream side of the intake port 6 than a vertical line V2 passing through the uppermost position of the inclined wall 21, and is lower than the vertex of the lower surface of the inner wall 6a of the intake port 6. Also, on the inclined wall 21, a tangential plane T including the position P is inclined forwardly downward toward the upstream side of the intake port 6.

Regarding the above-described water injector 11, when water leaks from the injection port 13a due to malfunctioning, etc., the water (leaked water) drops spontaneously and falls to the position P on the inclined wall 21, and flows along the inclined wall 21 to the upstream side of the intake port 6. In this way, since the leaked water falling on the inclined wall 21 flows to the upstream side of the intake port 6, the leaked water can be prevented from flowing to the downstream side of the intake port 6.

Figure 2A:
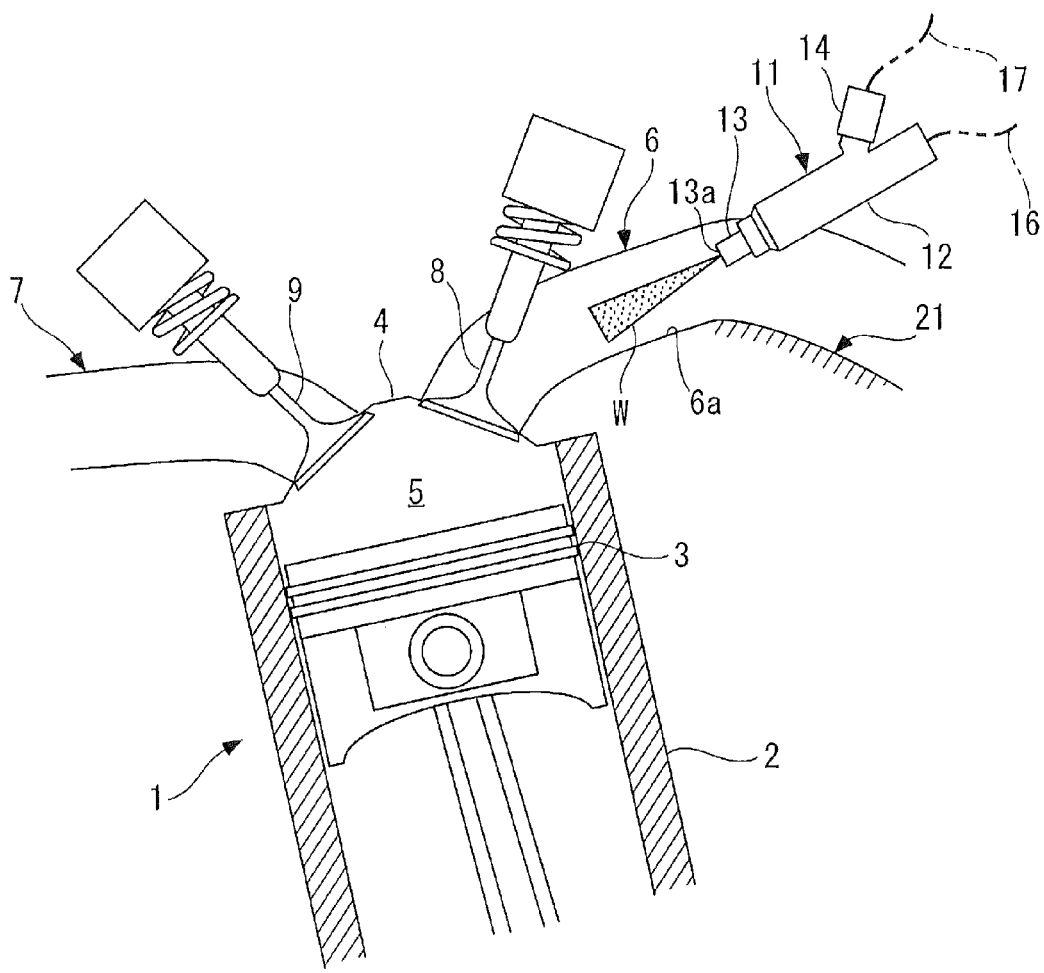
FIG. 2(a) is a view showing a state in which a cylinder, an intake port, etc. are inclined when the internal combustion engine of FIG. 1(a) is installed in a vehicle.
Figure 2B:
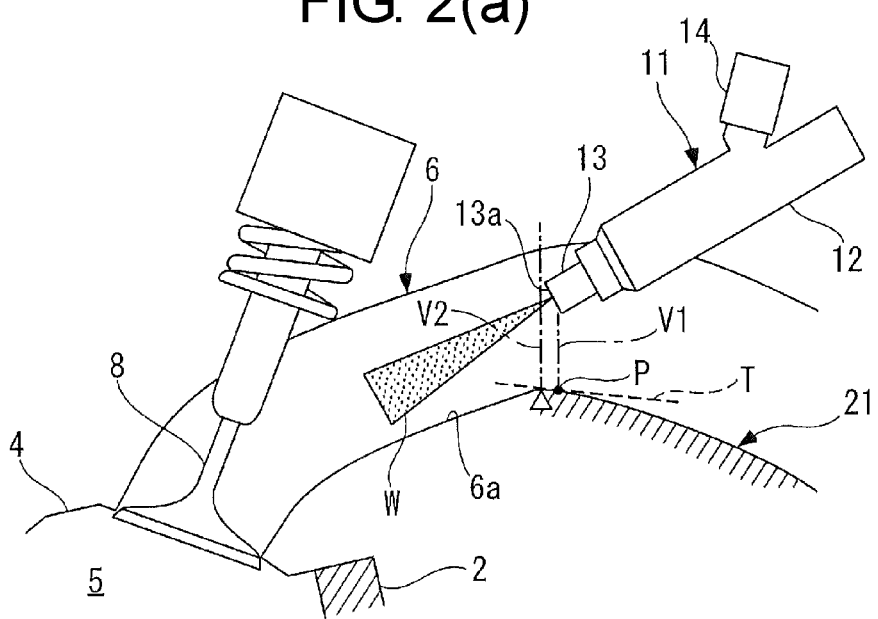
FIG. 2(b) shows an enlarged view of the water injector and the intake port in the internal combustion engine of FIG. 2(a).

FIG. 2(a) shows a state in which the cylinder 2 and the intake port 6, etc. are inclined to the left by a predetermined angle (for example, 10 to 15 degrees) with respect to the engine 1 shown in FIG. 1(a) and FIG. 1(b) when the engine 1 of FIG. 1(a) and FIG. 1(b) is installed in a vehicle (not shown). As shown in FIG. 2(b), even when the engine 1 is installed in the vehicle in an inclined state, the aforementioned positional relationship between the injection port 13a of the water injector 11 and the inclined wall 21 of the intake port 6 is maintained. Therefore, in the above-mentioned case where the engine 1 is installed in the vehicle in an inclined state, even if water leaks from the injection port 13a due to malfunctioning of the water injector 11, etc., it is possible to prevent the leaked water from flowing downstream of the intake port 6.

As described in detail above, according to the present embodiment, by injecting water from the injection port 13a of the water injector 11 during operation of the engine 1, it is possible to cool off the intake port 6 itself or the air sucked into the intake port 6 with the vaporization heat of the water. When the operation of the engine 1 is stopped, even if water leaks from the injection port 13a due to malfunctioning of the water injector 11, etc., the leaked water can flow to the upstream side of the intake port 6 via the inclined wall 21 of the intake port 6. Thus, it is possible to prevent the water leaking from the water injector 11 from flowing to the downstream side of the intake port 6 or entering the combustion chamber 5. As a result, water hammer that occurs at the time of starting due to accumulation of water in the combustion chamber 5 can be prevented, and the problems in the engine 1 can be avoided.

It should be noted that the disclosure is not limited to the above-described embodiment, but can be implemented in various forms. For example, in the embodiment, the inner wall 6a of the intake port 6 is provided with the inclined wall 21 as the leaked water blocking part of the disclosure, but the disclosure is not limited thereto. Various configurations can be adopted as the leaked water blocking part if the leaked water from the water injector 11 can be prevented from flowing to the downstream side of the intake port 6. For example, the leaked water blocking part may be configured to block the leaked water from the water injector 11 in the intake port 6, temporarily store the leaked water, and then discharge the leaked water to the outside.

In addition, the details of the configurations of the water injector 11 and the intake port 6 shown in the embodiment are merely examples and can be appropriately changed within the scope of the intention of the disclosure.

According to this configuration, the body part of the water injection device is mounted to the intake port, and the injection port provided at the front end of the body part faces the interior of the intake port. During operation of the internal combustion engine installed in the vehicle, by injecting water from the injection port of the water injection device, it is possible to cool off the intake port itself or the air sucked into the intake port with the vaporization heat of the water. Also, the leaked water blocking part is provided at the intake port to which the water injection device is mounted, so as to prevent water from flowing to the downstream side of the intake port when water leaks from the injection port of the water injection device. Thus, for example, when the operation of the internal combustion engine is stopped, even if water leaks from the injection port due to malfunctioning of the water injection device, etc., it is possible to prevent the water from flowing to the downstream side of the intake port or entering the combustion chamber communicating with the downstream side of the intake port. As a result, it is possible to prevent the occurrence of water hammer at the time of starting due to accumulation of water in the combustion chamber, and the problems in the internal combustion engine can be avoided.

According to another embodiment of the disclosure, in the mounting structure of the water injection device of the internal combustion engine as described above, the body part is mounted to an upper part of the intake port, and the leaked water blocking part is disposed below the injection port on an inner wall of the intake port and has an inclined wall 21 formed to be inclined forwardly downward from a vicinity of the injection port toward an upstream side of the intake port.

According to this configuration, while the body part of the water injection device is mounted to the upper part of the intake port, the inclined wall that serves as the leaked water blocking part is disposed below the injection port on the inner wall of the intake port. Since the inclined wall is formed to be inclined forwardly downward from the vicinity of the injection port toward the upstream of the intake port, water leaking from the injection port and falling on the inclined wall (leaked water) flows to the upstream side of the intake port along the inclined wall due to its own weight. As described above, the leaked water blocking part can be easily constructed with the inclined wall that has a relatively simple configuration. By making the leaked water from the injection port flow to the upstream side of the intake port, it is possible to prevent the leaked water from flowing to the downstream side of the intake port.

According to another embodiment of the disclosure, in the mounting structure of the water injection device of the internal combustion engine as described above, the body part is mounted to the intake port so that an intersection point P between the inner wall of the intake port and a vertical line V1 passing through the injection port is located on the inclined wall.

According to this configuration, the intersection point between the inner wall of the intake port and the vertical line passing through the injection port is located on the inclined wall when the water injection device is mounted to the intake port. As a result, the leaked water dropping spontaneously from the injection port falls on the inclined wall and flows along the inclined wall to the upstream side of the intake port. Therefore, with the water injection device installed to put the injection port of the water injection device and the inclined wall of the intake port in the above positional relationship, it is possible to reliably prevent the leaked water from the injection port from flowing to the downstream side of the intake port.

According to another embodiment of the disclosure, in the mounting structure of the water injection device of the internal combustion engine as described above, the body part is mounted to the intake port so that on the inclined wall, a tangential plane T including an intersection point with a vertical line passing through the injection port is inclined forwardly downward toward the upstream side of the intake port.

According to this configuration, with the water injection device mounted to the intake port, on the inclined wall, the tangential plane including the intersection point with the vertical line passing through the injection port is inclined forwardly downward toward the upstream of the intake port. As a result, as in the above embodiment, since the leaked water dropping spontaneously from the injection port and falling on the inclined wall flows to the upstream side of the intake port, it is possible to reliably prevent the leaked water from flowing to the downstream side of the intake port.

What is claimed is:

1. A mounting structure of a water injection device of an internal combustion engine, the water injection device being mounted to an intake port of the internal combustion engine installed in a vehicle and injecting water into the intake port during operation of the internal combustion engine,
   wherein the water injection device has a body part mounted to the intake port and an injection port disposed at a front end of the body part in a state of facing an interior of the intake port and injecting water, and
   the intake port has a leaked water blocking part for preventing water from flowing to a downstream side of the intake port when water leaks from the injection port.

2. The mounting structure of the water injection device of the internal combustion engine according to claim 1, wherein the body part is mounted to an upper part of the intake port, and
   the leaked water blocking part is disposed below the injection port on an inner wall of the intake port and has an inclined wall formed to be inclined forwardly downward from a vicinity of the injection port toward an upstream side of the intake port.

3. The mounting structure of the water injection device of the internal combustion engine according to claim 2, wherein the body part is mounted to the intake port so that an intersection point between the inner wall of the intake port and a vertical line passing through the injection port is located on the inclined wall.

4. The mounting structure of the water injection device of the internal combustion engine according to claim 2, wherein the body part is mounted to the intake port so that on the inclined wall, a tangential plane comprising an intersection point with a vertical line passing through the injection port is inclined forwardly downward toward the upstream side of the intake port.

* * * * *